United States Patent Office 3,479,190
Patented Nov. 18, 1969

3,479,190
EDIBLE COMPOSITIONS AND PROCESS
Alexander J. Ganz, Wilmington, Del., assignor to Hercules Incorporated, Wilmington, Del., a corporation of Delaware
No Drawing. Filed May 23, 1966, Ser. No. 551,912
Int. Cl. A23g 3/00
U.S. Cl. 99—139                                    7 Claims

ABSTRACT OF THE DISCLOSURE

A topping composition comprising a fat, an emulsifier, and hydroxypropyl cellulose or carboxymethyl hydroxypropyl cellulose.

---

The present invention relates to a composition adapted for use as food preparations and process of preparing.

Although not limited thereto, for the sake of clarity and convenience this invention will be described hereinafter for the most part with reference to food preparations well known in the art as "whipped toppings." The term "whipped toppings" is used in the art broadly to include compositions prepared from emulsions which emulsions have been aerated by introducing into same air or other edible nontoxic inert gas by beating or discharging the emulsion from an aerosol type container. Although the "whipped toppings" are usually employed as a topping on a food product, they are not restricted to this use; e.g. they are also used as a filling or internal layer in a food product. Usually the emulsions involved in the art to which this invention relates are primarily oil (fat)-in-water type emulsions.

The present invention is intended to include (1) compositions comprising a fat, an emulsifier, and a cellulose ether selected from the group consisting of hydroxypropyl cellulose and carboxymethyl hydroxypropyl cellulose, (2) emulsified compositions comprising a fat, an emulsifier, water, and at least one of said cellulose ethers, (3) an emulsified and aerated food preparation comprising a fat, an emulsifier, water and at least one of said cellulose ethers, (4) process of preparing the emulsion in (2) above, and (5) process of preparing the food preparation in (3) above.

Except for the cellulose ether, all the ingredients of the compositions disclosed herein are known in the art and therefore are not per se a part of the present invention; however, for the sake of completeness said other ingredients will be discussed briefly.

The present invention resides in the use of at least one of hydroxypropyl cellulose and carboxymethyl hydroxypropyl cellulose as the water soluble gum in the compositions hereof. The cellulose ether compounds used herein not only belong to different chemical classes of compounds than do the water soluble gums heretofore employed in the art, but they are novel cellulose ether compounds. The novel cellulose ether compounds used in the present invention and the novel process of making same are disclosed and claimed in U.S. Patents Nos. 3,278,521 and 3,357,971, respectively. The hydroxypropyl cellulose used in the examples hereinafter was prepared substantially in accordance with the procedure set forth in Example 17 of U.S. Patent No. 3,278,521. The carboxymethyl hydroxypropyl cellulose used in the examples hereinafter was prepared substantially in accordance with the procedure set forth in Examples 6–11 of U.S. Patent No. 3,357,971.

The purpose of the following paragraph is to explain the use herein and in the prior art of the terms "degree of substitution" ("D.S.") and "molecular substitution" ("M.S.").

There are three hydroxyl groups in each anhydroglucose unit in the cellulose molecule. D.S. is the average number of hydroxyl groups substituted in the cellulose per anhydroglucose unit. M.S. is the average number of moles of reactant combined with the cellulose per anhydroglucose unit. For the alkyl and carboxyalkyl derivatives of cellulose, the D.S. and the M.S. are the same. For the hydroxyalkyl derivatives of cellulose, the M.S. is generally greater than the D.S. The reason for this is that each time a hydroxyalkyl group is introduced into the cellulose molecule, an additional hydroxyl group is formed which itself is capable of hydroxyalkylation. As a result of this side chains of considerable length may form on the cellulose molecule. The M.S./D.S. ratio represents the average length of these side chains. Thus, from the foregoing it will be seen that the D.S. of a cellulose derivative can be no higher than 3, but that the M.S. may be considerably higher than 3, depending on the extent to which side chains are formed.

For the sake of brevity the following designations will be used sometimes hereinafter: HPC is hydroxypropyl cellulose, CMC is carboxymethylcellulose, CMHPC is carboxymethyl hydroxypropyl cellulose, MEC is methyl ethyl cellulose.

The examples given hereinafter illustrate various ways of practicing the present invention, but they are not intended to limit the present invention beyond the scope of the appended claims.

In the examples and elsewhere herein, percent is by weight. All viscosities given herein were determined with a standard Brookfield Synchro-Lectric LVF viscometer at 25° C.

The process employed in the examples given hereinafter was as follows:

First the emulsion was prepared and its stability determined. The emulsion was whipped to form a foamed topping. Several properties of the whipped topping were determined.

The emulsion was prepared by dispersing the gum in hot water (about 70° C.) and then mixing with additional unheated or cooled water until all the gum had dissolved and the mixture had dropped to about room temperature. The fat and emulsifier were melted together and slowly mixed with the aqueous solution of the gum. The resulting mixture was pasteurized, homogenized and cooled. Merely whipping the emulsion gave the whipping topping.

The stability of the emulsion was determined as follows. A portion of the emulsion was stored in a wide mouth jar at room temperature (i.e. at about 72° F.) for two weeks. An emulsion which is unstable will (under these conditions) soon separate into two layers, namely a bottom clear serum layer and a top creamy layer. The stability was considered "poor" when a serum layer of about 2% or more (by weight of the total emulsion) appeared in about 16 hours or less. The stability was considered "good" when no more than a trace of separation occurred in two weeks. All stabilities between poor and good were considered "fair."

Foamed toppings were prepared from the emulsions by whipping them in a standard type conventional mixer (i.e. a Model 3C Kitchen Aid Mixer) at speed 8 (maximum speed is 10) using 400 grams of emulsion in a 5-quart bowl at a starting temperature of about 40° F. After storage at room temperature for 72 hours, the stability of the toppings was determined. The stability was considered "poor" when there was either a substantial decrease in volume or substantial serum separation within 24 hours. The stability was considered "good" when there was neither a substantial decrease in volume nor substantial serum separation within 72 hours. All stabilities between poor and good were considered "fair." The products of the present invention are also stable in acid systems, e.g. such as that encountered in fruit juices (pH of about 3–5). The products of the present invention also have good freeze-thaw stability.

Resistance to overwhipping was determined by whipping the emulsion until breakdown of the resulting foam commenced. Foam breakdown results in an increase in density, poor decorating properties, development of pastiness or too heavy a body of the whipped topping. Body was evaluated organoleptically and rated "poor" (if fluffy, too foamy, pasty, gummy or too heavy), "good" (if creamy, nongummy, nonpasty, etc.) or "fair" (if the whipped toppings possessed properties between poor and good.

Decorating properties were determined by swirling the whipped toppings with a spatula and observing for formation of peaks and ridges.

The density of the whipped toppings was determined by obtaining the weight of a given volume of topping and dividing this weight by said volume.

Further details appear in Table 1 (Examples 1–11) hereinafter.

sulting dispersion was mixed with additional unheated or cooled water until all the gum had dissolved and the mixture had dropped to about room temperature (about 22° C.). This disperses the HPC at elevated temperature and dissolves it at room temperature. This is somewhat faster than dispersing and dissolving the HPC at room temperature, and therefore will be the preferred procedure. The fat and emulsifier were melted together and slowly mixed with the aqueous solution of the gum. When using HPC the fat and emulsifier (usually both) should be in liquid form when added, and preferably they will be added after the HPC dissolves. The fat and emulsifier may be added together or separately in any order. Then the mixture was heated to pasteurization temperature (e.g. 160° F.) and held there for the desired length of time (e.g. usually about 30 minutes). Of course other temperatures and times may be used. The pasteurized mixture was then homogenized at 160° F. using a conventional homogenizer, namely a Manton Gaulin homogenizer at 2000 p.s.i.g. on the first stage and at 500 p.s.i.g. on the second stage. Of course other temperatures and pressure conditions may be used for the homogenization. Next the homogenized

TABLE 1

| Ex. | Emulsion [1] | | | | | Whipped Topping | | Total Properties [2] Score | Substitution and Viscosity Values of Gums | |
|---|---|---|---|---|---|---|---|---|---|---|
| | Gum | | Emulsifier, percent | | | | | | | |
| | Type | Percent | A [3] | B [4] | C [5] | Density | Mins. Whipped | | Substitution [6] | Viscosity [7] |
| 1 | None | | 0.24 | 0.16 | | 0.29 | 2.5 | 4 | | |
| 2 | CMC | 1.0 | 0.24 | 0.16 | | 0.34 | 2.0 | 6 | 0.69 | 480 |
| 3 | MEC | 2.0 | 0.24 | 0.16 | | 0.28 | 2.25 | 6 | 0.54  1.0 | 245 |
| 4 | HPC | 1.2 | 0.24 | 0.16 | | 0.33 | 1.5 | 12 | 3.8 | 335 |
| 5 | CMHPC | 0.5 | 0.24 | 0.16 | | 0.31 | 5.5 | 11 | 4.0  0.15 | 282 |
| 6 | HPC | 0.35 | 0.24 | 0.16 | | 0.31 | 5.5 | 12 | 6.0 | 50 |
| 7 | HPC | 0.5 | 0.24 | 0.16 | | 0.30 | 5.0 | 12 | 5.0 | 25 |
| 8 | HPC | 2.0 | 0.24 | 0.16 | | 0.37 | 4.0 | 11 | 3.8 | 335 |
| 9 | HPC | 4.0 | 0.24 | 0.16 | | 0.38 | 5.0 | 10 | 4.0 | [8] 83 |
| 10 | HPC | 0.5 | 0.24 | 0.16 | | 0.22 | 2.5 | 10 | 3.2 | 300 |
| 11 | CMHPC | 0.35 | 0.2 | 0.2 | 0.1 | 0.29 | 4.5 | 12 | 4.0  0.35 | 147 |

[1] In each example 25% fat was used and the balance of 100% total was water. Fat was a mixture of hydrogenated vegetable oil available under the proprietary name "Paramount C."
[2] These include the following. Emulsion: Stability at room temp. Whipped topping: Stability at room temp., resistance to overwhipping, decorating properties, body, taste. Properties were scored as follows: Poor=zero; Fair=1; Good=2.
[3] Sorbitan monostearate. Available under the proprietary name "Span 60."
[4] Polyoxyethylene sorbitan monostearate. Available under the proprietary name "Tween 60."
[5] Sodium sulfoacetates of mono- and di-glycerides. Available under the proprietary name "Emargol."
[6] For the MEC and CMHPC the substitution values are given in the following order. For MEC, methyl D.S. followed by ethyl D.S. For CMHPC, hydroxypropyl M.S. followed by carboxymethyl D.S.
[7] Cps. at 25° C. in 2% aqueous solution unless otherwise indicated.
[8] 5% aqueous solution.

In addition to the examples in Table 1 hereinbefore, good results were also obtained with HPC and CMHPC using 0.1% of each by weight of the emulsion.

The foregoing examples illustrate various ways in which the present invention may be carried out; however, it will be appreciated by those skilled in the field to which this invention relates that many variations may be made therein within the scope of the claims hereof.

The stability test conditions employed herein and set forth hereinbefore amount to quite an accelerated test as compared to the conditions which are normally encountered with the emulsion and whipped topping products hereof. If these products are not used soon after preparation, they are stored under refrigerator conditions from the time of preparation until use, i.e. at about 40° F. or in the frozen state and thawed out prior to use.

The amount of gum applicable is not critical and may be varied considerably. 0.05%–10%, preferably 0.1%–2%, gum by weight of the total emulsion gives satisfactory results.

The emulsion may be prepared in a ready to use state merely by aerating (e.g. by whipping or discharging from an aerosol container) or in a concentrated form which requires dilution with a liquid such as e.g. water, sugar syrup, or milk prior to use. In the later case some of the water is eliminated and this of course results in a percentage increase (by weight of the total composition) in the other ingredients present.

A typical way of making the emulsion, e.g. when using HPC as the gum, includes the following. The HPC was dispersed in hot water (about 70° C.) and then the remixture was rapidly cooled to about 40° F. (lower temperatures are also applicable) before storing, packaging or using. Although rapid cooling of the homogenized mixture is not essential, it usually contributes to a whipped topping product of somewhat higher stability. The CMHPC of the present invention may also be incorporated as described above for the HPC but there is no advantage in dispersing the CMHPC at elevated temperature and dissolving it at room temperature; thus, instead the CMHPC may just as well be dispersed and dissolved at about room temperature.

In addition to the four basic ingredients already mentioned, namely water, fat, emulsifier, and gum, of the emulsion, other ingredients may be and often are used. These include, e.g., sweeteners, flavoring agents, and coloring agents.

Conventional fats (oils) applicable include e.g. the esters of glycerol and fatty acids wherein all of the three hydroxyl groups of the glycerol have been esterified. They may be partially or completely hydrogenated fats. Blends of these fats may also be used. Since the products of the present invention are foods, or adapted for use in foods, the fats employed therein should be non-toxic and substantially free from odor and taste, i.e. they should be edible fats.

As is known, emulsifiers are materials which alter the surface energy relationships at an oil (fat)-water interface in such a manner as to inhibit coalescence of the fat particles. Conventional emulsifiers applicable include e.g. monoglycerides, mixtures of monoglycerides and diglycerides, glyceryl lactopalmitates, fatty acid esters of propylene glycol, acetylated tartaric acid esters of monoglycerides, sulfoacetates of a mixture of monoglycerides and diglycerides, lecithin and those emulsifiers commonly known in the trade as Tweens and Spans. Tweens are polyoxyethylene condensates of sorbitan fatty acid esters. Spans are partial esters of sorbitol and sorbitan.

The following formulations, in addition to those disclosed hereinbefore, further illustrate typical formulations applicable in the present invention.

FORMULATION 1

| | Ingredients | Amount, percent [1] | |
|---|---|---|---|
| 1 | HPC | 0.5 | Disperse. |
| | Water (70° C.) | 40 | |
| 2 | Water (ice) | 34.05 | Add to 1 and stir until HPC is dissolved and solution is at about room temperature. |
| 3 | Fat | 25 | |
| | Polyoxyethylene stearate ("SPAN 60") | 0.1 | |
| | Polyoxyethylene sorbitan monostearate ("TWEEN 60") | 0.2 | Melt together and add to mixture of 1 and 2. |
| | Polyoxyethylene sorbitan monooleate ("TWEEN 80") | 0.1 | |
| | Lecithin | 0.05 | |
| 4 | | Pasteurize, homogenize and cool. | |

[1] By weight of the total emulsion formulation.

FORMULATION 2

| | Ingredients | Amount, percent [1] | |
|---|---|---|---|
| 1 | HPC | 1.0 | Disperse. |
| | Water (70° C.) | 40 | |
| 2 | Water (ice) | 18.55 | |
| | Sugar | 15 | Add to 1 and stir per Formulation 1. |
| | Fat | 25 | |
| | Mono-diglyceride mixture ("ATMOS 150") | 0.3 | |
| 3 | Polyoxyethylene sorbitan monostearate ("TWEEN 60") | 0.15 | Melt together and add per Formulation 1. |
| | Lecithin | 0.1 | |
| 4 | | Pasteurize, homogenize and cool. | |

[1] By weight of the total emulsion formulation.

As many apparent and widely different embodiments of this invention may be made without departing from the spirit and scope thereof, it is to be understood that the invention is not limited to the specific embodiments thereof except as defined in the appended claims.

What I claim and desire to protect by Letters Patent is:

1. A composition adapted to be emulsified and aerated for use as a food preparation, which composition comprises a fat, an emulsifier, and a cellulose ether selected from the group consisting of hydroxypropyl cellulose and carboxymethyl hydroxypropyl cellulose, said hydroxypropyl cellulose having an M.S. of at least 2, said carboxymethyl hydroxypropyl cellulose having a hydroxypropyl M.S. of at least 2 and a carboxymethyl D.S. of 0.001–0.4, the amount of said cellulose ether being sufficient to substantially stabilize the aerated composition.

2. An emulsified composition adapted to be aerated for use as a food preparation, which composition comprises a fat, an emulsifier, water, and a cellulose ether selected from the group consisting of hydroxypropyl cellulose and carboxymethyl hydroxypropyl cellulose, said hydroxypropyl cellulose having an M.S. of at least 2, said carboxymethyl hydroxypropyl cellulose having a hydroxypropyl M.S. of at least 2 and a carboxymethyl D.S. of 0.001–0.4, the amount of said cellulose ether being sufficient to substantially stabilize the aerated composition.

3. An emulsified and aerated food preparation comprising a fat, an emulsifier, water, and a cellulose ether selected from the group consisting of carboxymethyl hydroxypropyl cellulose and hydroxypropyl cellulose, said hydroxypropyl cellulose having an M.S. of at least 2, said carboxymethyl hydroxypropyl cellulose having a hydroxypropyl M.S. of at least 2 and a carboxymethyl D.S. of 0.001–0.4, the amount of said cellulose ether being sufficient to substantially stabilize the aerated food preparation.

4. Process of preparing an emulsified composition adapted to be aerated for use as a food preparation, which process comprises dissolving in water a cellulose ether selected from the group consisting of carboxymethyl hydroxypropyl celulose and hydroxypropyl cellulose, and then mixing same with a fat and an emulsifier, pasteurizing and homogenizing the mixture, then finally cooling the resulting emulsion, said hydroxypropyl cellulose having an M.S. of at least 2, said carboxymethyl hydroxypropyl cellulose having a hydroxypropyl M.S. of at least 2 and a carboxymethyl D.S. of 0.001–0.4, the amount of said cellulose ether being sufficient to substantially stabilize the aerated composition.

5. Process of preparing an emulsified and aerated food preparation, which process comprises dissolving in water a cellulose ether selected from the group consisting of hydroxypropyl cellulose and carboxymethyl hydroxypropyl cellulose, and then mixing same with a fat and an emulsifier, pasteurizing and homogenizing the mixture, cooling the resulting emulsion, then finally aerating the emulsion, said hydroxypropyl cellulose having an M.S. of at least 2, said carboxymethyl hydroxypropyl cellulose having a hydroxypropyl M.S. of at least 2 and a carboxymethyl D.S. of 0.001–0.4, the amount of said cellulose ether being sufficient to substantially stabilize the aerated food preparation.

6. Process of preparing an emulsified composition adapted to be aerated for use as a food preparation, which process comprises dispersing hydroxypropyl cellulose in hot water, cooling the dispersion and then mixing same with a fat and an emulsifier in liquid form, pasteurizing and homogenizing the mixture, then finally cooling the resulting emulsion, said hydroxypropyl cellulose having an M.S. of at least 2, the amount of said hydroxypropyl cellulose being sufficient to substantially stabilize the aerated composition.

7. Process of preparing an emulsified and aerated food preparation, which process comprises dispersing hydroxypropyl cellulose in hot water, cooling the dispersion and then mixing same with a fat and an emulsifier, in liquid form, pasteurizing and homogenizing the mixture, cooling the resulting emulsion, then finally aerating the emulsion, said hydroxypropyl cellulose having an M.S. of at least 2, the amount of said hydroxypropyl cellulose being sufficient to substantially stabilize the aerated food preparation.

References Cited

UNITED STATES PATENTS

| 2,785,982 | 3/1957 | Weaver et al. | 99—139 |
| 2,846,314 | 8/1958 | Aichele et al. | 99—139 |
| 3,009,812 | 11/1961 | Ganz | 99—139 |
| 3,010,830 | 11/1961 | Gerndt | 99—139 |
| 3,350,209 | 10/1967 | Rodgers | 99—139 |

RAYMOND N. JONES, Primary Examiner

J. M. HUNTER, Assistant Examiner

Dedication 3,479,190.—*Alexander J. Ganz*, Wilmington, Del. EDIBLE COMPOSITIONS AND PROCESS. Patent dated Nov. 18, 1969. Dedication filed July 31, 1970, by the assignee, *Hercules Incorporated*.
Hereby dedicates said patent to the Public.
[*Official Gazette November 17, 1970.*]